(12) United States Patent
Hogan

(10) Patent No.: US 6,181,828 B1
(45) Date of Patent: Jan. 30, 2001

(54) APPARATUS AND METHOD FOR REDUCING COMPRESSIBILITY OF UNAUTHORIZED COPIES OF COLOR IMAGES AND VIDEO SEQUENCES

(75) Inventor: Josh N. Hogan, Los Altos, CA (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/053,973

(22) Filed: Apr. 2, 1998

(51) Int. Cl.[7] .................................................. G06K 9/36
(52) U.S. Cl. ............................................. 382/254; 382/232
(58) Field of Search .......................... 382/254, 244–247, 382/232, 239, 243, 100; H04N 1/44

(56) References Cited

U.S. PATENT DOCUMENTS 5,216,516 * 6/1993 Tanaka et al. ...................... 358/426

* cited by examiner

Primary Examiner—Thomas D. Lee
Assistant Examiner—Stephen Brinich

(57) ABSTRACT

Compressibility-reducing artifacts are added to redundant areas of color images and video sequences. A first artifact change is made to a luminance component of a redundant area, and at least one other artifact change is made to chrominance components of the redundant area. The artifact changes are perceptively balanced such that the artifacts are not perceptible when the image is displayed on a monitor. However, the artifacts reduce redundancy in the image and, therefore, reduce compressibility of the image. In order to recompress a copied image, either the quality of the image must be reduced or file size of the image must be increased. Increasing file size will make redistribution impractical. Consequently, attempts to make and redistribute unauthorized copies of video images and sequences will be discouraged.

29 Claims, 4 Drawing Sheets

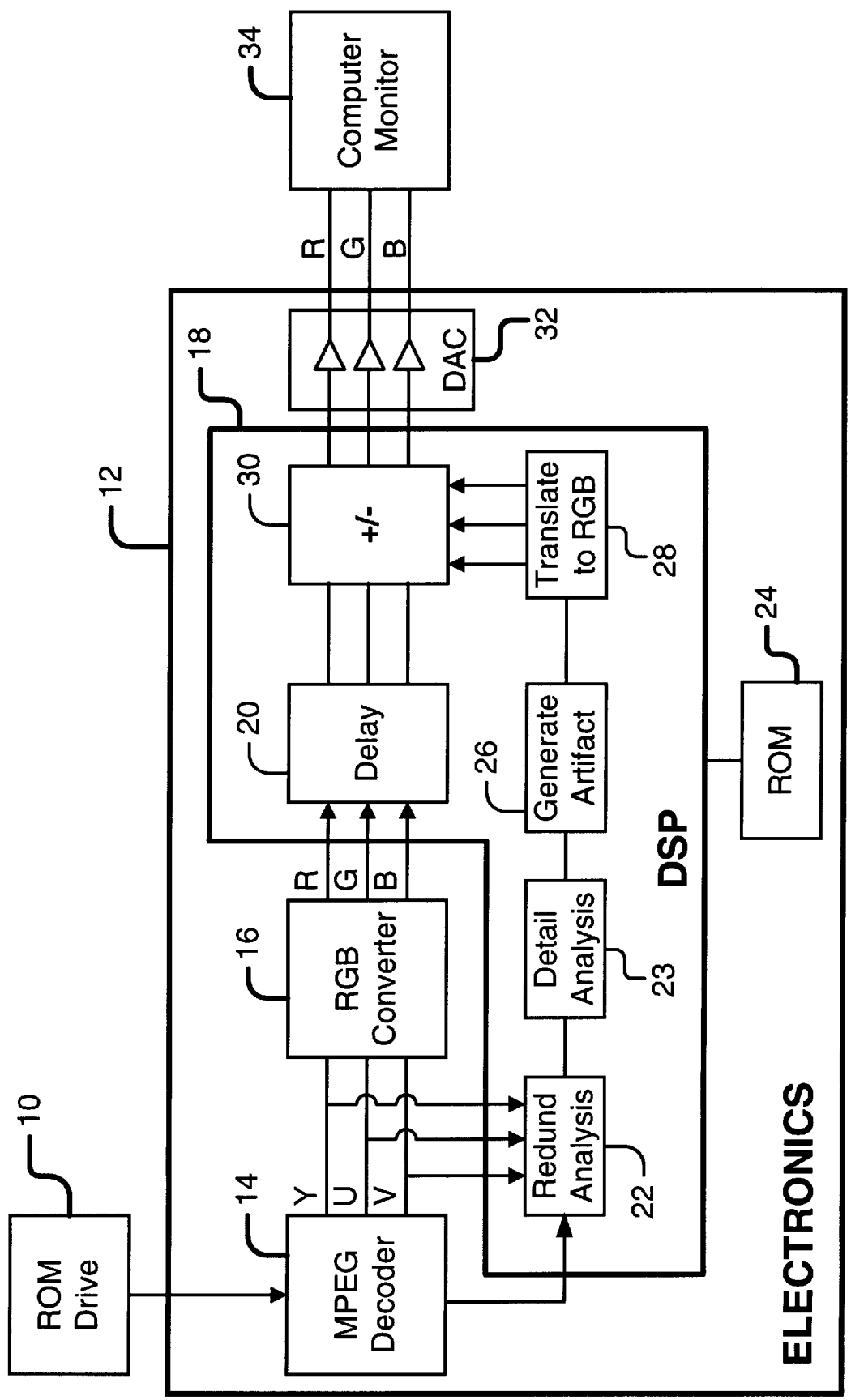

APPARATUS AND METHOD FOR REDUCING COMPRESSIBILITY OF UNAUTHORIZED COPIES OF COLOR IMAGES AND VIDEO SEQUENCES

BACKGROUND OF THE INVENTION

The invention relates to image and video display. More specifically, the invention relates to methods and apparatus for discouraging the unauthorized copying and distribution of compressed color images and video sequences.

Digital Versatile Disc (DVD) players are providing consumers with access to wide screen movies having high quality images and high fidelity sound. The high quality format of the DVD players brings theatre-like entertainment to the home.

The same high quality format can also be viewed on a monitor of a computer having a DVD-ROM drive and associated electronics. The DVD-ROM drive reads a DVD-ROM disc and outputs a stream of data compressed according to an MPEG standard. The DVD-ROM electronics decodes the compressed data into uncompresssed data, converts the uncompressed data to RGB signals, and sends the RGB signals to the computer monitor via a cable for display.

However, the cable between the computer and the monitor is unsecured. Therefore, uncompressed data sent to the monitor can be intercepted, recompressed and redistributed. In the past, the high cost of compression technology would have provided a barrier to such copying and redistribution, particularly with regard to video images. However, with compression technology decreasing in cost and software compression being made commercially available, the barrier is being overcome.

Unauthorized copying is not restricted to DVD discs. Unauthorized copying also applies to color images of large sizes. The barrier of copying and compressing the large images has already been overcome. Many software applications allow an image to be compressed, typically using a lossy compression scheme such as JPEG or MPEG.

Additionally, the growing availability of digital images and video sequences over the Internet has increased the need to discourage unauthorized copying and redistribution.

Home copying and professional piracy are great threats to artists, producers and copyright owners. There is a need for discouraging the unauthorized copying and distribution of images and video sequences.

SUMMARY OF THE INVENTION

Unauthorized copying and redistribution are discouraged by the present invention, which can be regarded as a method of processing a signal representing an image. The signal is analyzed to select redundant areas of the image. A plurality of compressibility-reducing artifacts are added to the domain components of a selected area by making a first artifact change in at least one domain component of the selected area; and making at least one other artifact change to at least one other domain component of the selected area such that the artifacts in the selected area are perceptively balanced. Thus, the balanced artifacts are not perceptible while the processed signal is being displayed. An image including the artifacts is riot readily compressible because the artifacts reduce redundancy in the image.

This method can be utilized by any apparatus that produces images or video sequences. When applied to DVD-ROM electronics of a computer, for example, an RGB output of the apparatus sends uncompressed data containing balanced artifacts to a monitor of the computer. The artifacts will not be perceived by a viewer while the signal is being displayed. However, the artifacts will reduce the compressibility of images represented by the signal. If the signal is intercepted and copied, the copied images will not be recompressable to their original file size and their original quality. Consequently, redistribution will not be practical.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 1 is a block diagram of a DVD-ROM drive and associated electronics according to the present invention;

DETAILED DESCRIPTION OF THE INVENTION

Figure 2A:
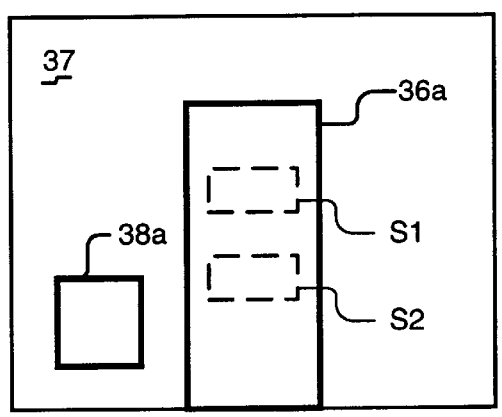
FIGS. 2a and 2b are illustrations of successive exemplary images that are processed by the DVD-ROM electronics, the successive images having temporal and spatial redundancy.

As shown in the drawings for purposes of illustration, the present invention is described in connection with a DVD-ROM drive and associated electronics for a computer. The DVD-ROM electronics generates an RGB signal including artifacts that discourage unauthorized copying and redistribution. Even if the RGB signal representing a large image or a sequence of video images is copied, the copied images will not be readily recompressible to their original file size and their original quality. Consequently, recompression and redistribution will be impractical.

FIG. 1 shows a DVD-ROM drive 10 and associated electronics 12 for a computer. The drive 10 plays DVD discs. Data stored on the DVD discs is compressed according to a well-known MPEG standard. When a DVD disc is being played, an output of the ROM drive 10 provides a stream of MPEG-compressed data to the DVD-ROM electronics 12. An MPEG decoder 14 decodes and expands the data stream into a video signal having luminance and chrominance components. Hereinafter, the video signal will be described in connection with Y (luminance), U (chrominance) and V (chrominance) components of a YUV domain. The YUV domain is used merely to facilitate an understanding the invention. It is understood that the components of the video signal could be from a different domain such as a Y, R-Y, B-Y domain.

An RGB converter 16 converts the video signal leaving the MPEG decoder 14 to an RGB domain having Red, Green and Blue components. A video signal leaving the RGB converter 16 is unprotected from unauthorized copying and redistribution.

To discourage unauthorized copying and redistribution from occurring, compressibility-reducing artifacts are added to the video signal leaving the RGB converter 16. The YUV components of the video signal are supplied to a digital signal processor (DSP) 18. The DSP 18 delays (e.g., stores) the video signal leaving the RGB converter 16 (block 20) and, during the delay, performs analysis on areas of the image represented by the YUV components of the video signal (blocks 22 and 23). As part of the analysis, the DSP 18 looks for areas having redundancy such as spatial redundancy in a single image and temporal redundancy in successive images (block 22). The analysis for spatial and temporal redundancy will be described in greater detail below in connection with FIGS. 2a and 2b. If the DSP 18 finds redundancy in an area, it analyzes the area for minimal detail (block 23). Minimal detail areas include areas that have relatively flat colors and areas of gradually changing brightness and color. In contrast, high detail areas include edges and other areas of sharp changes in intensity and color.

When an area is selected, the DSP 18 retrieves a pattern from Read-Only Memory (ROM) 24 and generates compressibility-reducing artifacts (block 26). A compressibility-reducing artifact has a changing pattern of intensity in a luminance component of the selected area. For example, the changing pattern could be a random pattern or a well defined pattern such as a sinusoidal wave. If only the luminance component of the sinusoidal wave was displayed on a computer monitor, dark and light bands would be perceived by a viewer.

However, another compressibility-reducing artifact has a changing pattern of saturation in a chrominance component of the selected area. The changes in saturation are selected to balance the perceived changes in intensity of the luminance. Consequently, the compressibility-reducing artifacts are not perceptible when the luminance and chrominance components are viewed together on a computer monitor.

After the compressibility-reducing artifacts have been generated, the DSP 18 translates the artifacts from the YUV domain to the RGB domain (block 28). The translated artifacts are then added to the delayed RGB signal (block 30). Thus, selected areas of the RGB signal leaving the DSP 18 include the compressibility-reducing artifacts. The artifacts are introduced in the RGB domain because all three components of the RGB domain have the same high bandwidth.

A digital-to-analog converter 32 converts the digital RGB signals leaving the DSP 18 to analog RGB signals. The analog RGB signals, in turn, are sent to an RGB output of the DVD-ROM electronics 12 and supplied to a monitor 34 for display. Because the artifacts are balanced in the RGB domain, the artifacts displayed on the monitor 34 are not perceptible to a viewer.

However, the artifacts will reduce the compressibility of the signal if the signal is intercepted and copied en route to the monitor 34. Consequently, the images represented by the copied signal will not be recompressed to their original file size and their original quality. Either the quality must be reduced or the file size must be increased. Increasing file size will make redistribution impractical. Thus, the method discourages unauthorized copying of DVD discs.

Figure 2B:
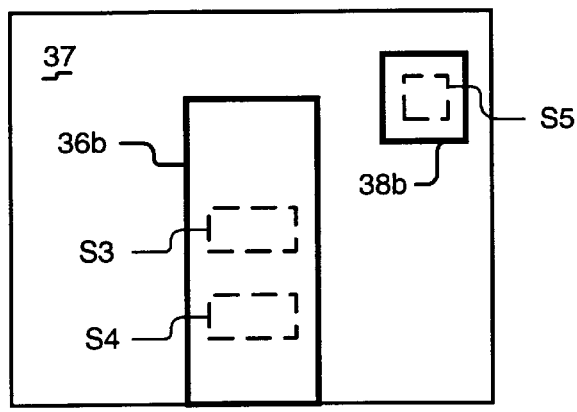

FIGS. 2a and 2b illustrate successive images having temporal and spatial correlation (i.e., redundancy). The images of FIGS. 2a and 2b include an elongated bar 36a, 36b. The bar 36a, 36b has a single, uniform color (e.g., bright red) that is set against a white background 37. Between edges of the bar 36a, 36b is minimal detail— constant color. High detail occurs at the edges of the bar 36a, 36b, where colors change abruptly. Additionally, the bar 36a, 36b has both spatial and temporal redundancy—spatial redundancy because the area between the edges can be broken up into 8×8 blocks that are correlated, temporal redundancy because the same bar 36a, 36b appears in successive images. The DSP 18 could add compressibility-reducing artifacts to one or more areas S1, S2 inside the bar 36a of FIG. 2a. Adding artifacts to more than one area S1, S2 would reduce the spatial redundancy of the bar 36a. The DSP 18 could also add compressibility-reducing artifacts S3, S4 to different areas of the bar 36b shown in FIG. 2b. Adding to more than one area S3, S4 would once again reduce the spatial redundancy of the bar 36b. However, adding the artifacts to different areas of successive images would also reduce the temporal redundancy of the bar 36a, 36b.

The image of FIG. 2a also includes a block 38a having minimal detail. In the image of FIG. 2b, the block 38b has been translated. Thus, the block 38b of FIG. 2b is correlated to the block 38a of FIG. 2a. The block 38b of FIG. 2b might be reconstructed from a motion vector. As the images are being outputted by the MPEG decoder 14, the DSP 18 could add a compressibility-reducing artifact to an area S5 of the block 38b of FIG. 2b, but not to the block 38a of FIG. 2a. Because the block 38b of FIG. 2b would include an artifact and the block 38a of FIG. 2a would not, motion analysis will not be efficiently exploited during recompression.

While the MPEG decoder 14 is decoding the MPEG-compressed data from the DVD-ROM drive 10 into an expanded stream of uncompressed data, the MPEG decoder 14 indicates to the DSP 18 whether redundancy is occurring in an image. The MPEG decoder 14 also indicates the type of redundancy. For example, if the MPEG decoder 14 is processing a motion vector, it sends a signal to the DSP 18, indicating that the area on the decoder output is being reproduced from a motion vector and, therefore, has redundancy. Such a signal could be provided from the MPEG decoder 14 directly to the DSP 18 (see FIG. 1). An artifact might be added to the area generated from the motion vector.

Figure 3:
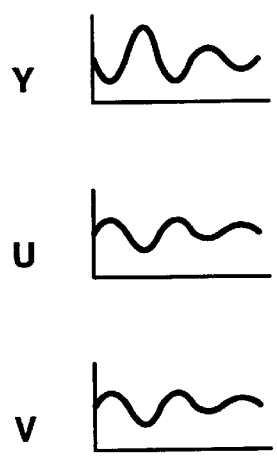
FIG. 3 is an illustration of compressibility-reducing artifacts in Y, U and V components of a selected area of an image, prior to RGB conversion by the DVD-ROM electronics.

FIG. 3 illustrates how the compressibility-reducing artifacts appear in the YUV components of a selected area of an image. The luminance and chrominance components have patterns of changing intensity and saturation. However, the changes in intensity of the luminance component are perceptively balanced by the changes in saturation of the chrominance components. For example, an increase in intensity would be perceptively balanced by a decrease in saturation. Therefore, when the components of FIG. 3 are converted to the RGB domain and displayed on the monitor, the viewer does not perceive the changes in intensity and saturation.

The compressibility-reducing artifacts have a somewhat random pattern. Disordered artifacts will not be recompressed efficiently and, therefore, are desirable. Well-ordered, repeatable artifacts might be recompressed efficiently.

Figure 4:
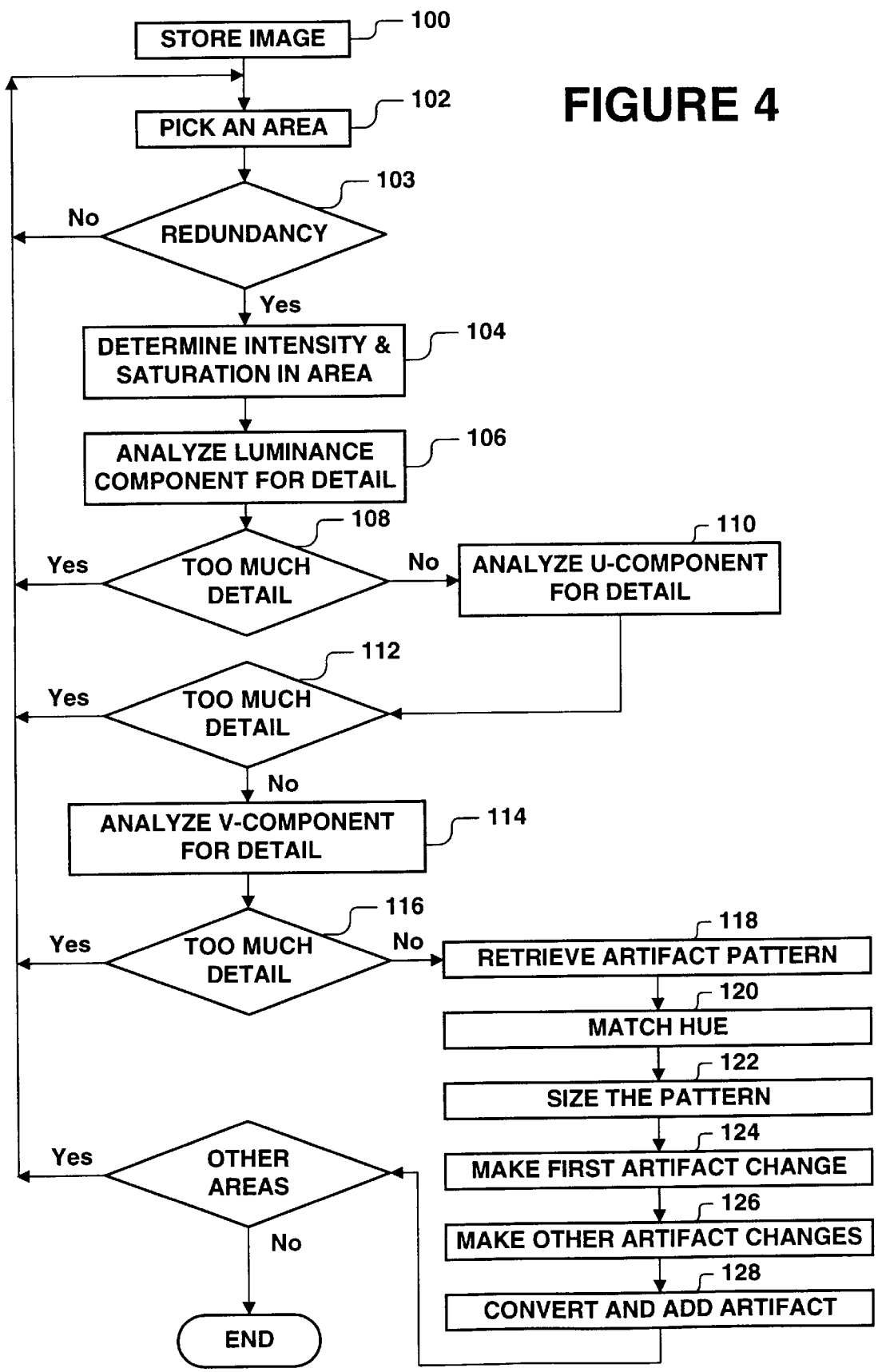
FIG. 4 is a flowchart of a method of imposing compressibility-reducing artifacts on a selected area of an image, the method being performed by a digital signal processor, which forms a part of the DVD-ROM electronics.

FIG. 4 shows a method of performing detail analysis and generating compressibility-reducing artifacts. The DSP 18 stores an image in memory (step 100) and picks a candidate area for analysis (step 102). For example, the image could be broken up into 8×8 blocks, and the blocks could be analyzed sequentially.

Next the DSP 18 determines whether the candidate area is correlated to another area, either in the same image or in a previous image. That is, the DSP 18 determines whether the candidate area is redundant (step 103). This step is easiest to implement if the information regarding redundancy is indicated by the PEG decoder 14. The compressed data stream that is supplied the MPEG decoder 14 by the DVD-ROM drive 10 already contains information regarding compression of the original images. Therefore, the MPEG decoder 14 could indicate spatial redundancy based on discrete cosine transform (DCT) coefficients that it uses to reconstruct an area. The MPEG decoder 14 could indicate temporal redundancy based on its use of motion vectors for reconstructing an area. Thus, use of a motion vector could provide a guideline for identifying a redundant area. Even if temporal redundancy is indicated, the DSP 18 would make an additional determination as to whether artifacts were imposed on the correlated area of the previous image. The DSP 18 would impose artifacts in every other correlated image of the sequence (e.g., image n, image n+2, image n+4) to prevent motion analysis from being efficiently exploited upon recompression.

If the MPEG decoder 14 does not indicate redundancy of the selected area (step 103), the DSP 18 picks another candidate area (step 102).

If, however, redundancy is indicated (step 103), intensity and saturation of the luminance and chrominance components for the candidate area are determined (step 104). Since the artifacts will increase and decrease the intensity and saturation of the luminance and chrominance components, the DSP 18 determines whether the intensity and saturation of the candidate area can be modified. For instance, a candidate area having an intensity of 15 bits would not be able to accommodate a sine wave artifact having an amplitude of 40 bits. It follows that candidate areas having black or white backgrounds, for example, would not be selected.

If an artifact can be imposed on the candidate area, the DSP 18 analyzes luminance of the candidate area for detail (step 106). Edges are to be avoided. If the luminance component has edges and other high detail characteristics, it will be difficult to create a smooth pattern that allows the changes in intensity to be balanced out. Resulting will be edges that can perceived by a viewer. Therefore, if too much detail is found in the luminance component (step 108), the candidate area is not selected and the DSP 18 analyzes the next area (step 102).

If, however, the luminance component of the candidate area is relatively free of detail and does not contain any abrupt edges, the DSP 18 then analyzes the U chrominance component for detail (step 110). If too much detail is found in the U chrominance component (step 112), the candidate area is not selected and the DSP analyzes the next area (step 102). If, however, the U chrominance component of the candidate area is relatively free of detail, the DSP 18 analyzes the V chrominance component for detail (step 114). If too much detail is found in the V chrominance component (step 116), the candidate area is not selected and the DSP 18 analyzes the next candidate area (step 102). If, however, the V chrominance component of the candidate area is relatively free of detail, the DSP 18 selects the candidate area.

If a candidate area is selected, the DSP 18 retrieves an artifact pattern from the ROM 24 (step 118). The artifact pattern has a predetermined shape and intensity that will create a smooth, controlled transition in the luminance and chrominance components. The changes in intensity and saturation are relatively smooth. If the changes in intensity and saturation are sharp, it will be difficult to perceptively cancel them out. However, if too smooth, the changes in saturation will not be filtered out by the RGB-to-NTSC converter 36 and will be recorded by the VCR 38.

At step 120, a hue for the artifact is selected to match the hue of the selected area. At step 122, the DSP 18 sizes the retrieved pattern to fit in the selected area. Thus, the amplitude of the artifact pattern is adjusted to fit within the intensity/saturation range. Intensity of the artifact is typically a function of the intensity of luminance.

At steps 124 and 126, the DSP 18 adds compressibility-reducing artifacts to at least two of the domain components of the image signal by making a first artifact change in the luminance component of the selected area (step 124) and making a second artifact change in one or both of the U and V chrominance components (step 126) such that the first artifact change is balanced and, therefore, perceptively canceled by the second artifact change while the image is being displayed. For example, a first sine wave is imposed on the luminance component, giving the luminance component a smooth, changing pattern. The first sine wave has an amplitude that is proportional to intensity of the luminance. An inverse sine wave is then imposed in the chrominance. The inverse sine wave has an amplitude which is proportional to saturation of the hue. The sum of the amplitudes in the chrominance perceptively balances the amplitude of the luminance.

At step 128, the DSP 18 converts and adds the compressibility-reducing artifacts to the stored RGB signal. An output of the DSP 18 is sent to the digital-to-analog converter 32.

Figure 5:
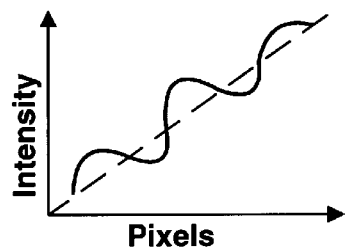
FIG. 5 is an illustration of a compressibility-reducing artifact added to a gradually-increasing luminance component of a selected area.

If intensity of the luminance of the selected area increases gradually, the luminance component could appear as shown in FIG. 5. The luminance component of the original area is shown in dashed, and the luminance signal containing the artifact is shown in solid.

The lack of perceptibility of the artifacts in the processed RGB signal might vary from monitor to monitor. This issue could be addressed by customizing the artifacts for a particular monitor. For example, a typical customization procedure might involve calibration during installation of the DVD-ROM drive 10 and electronics 12 to optimize performance for the particular monitor being used. The calibration would involve viewing artifacts on a portion of the monitor and changing intensity or saturation until the artifacts are blended or the contrast is softened.

The MPEG decoder 14 could be implemented on an ASIC. The ROM 24, in addition to storing the artifacts, could also store instructions for instructing the DSP 18 to perform the redundancy analysis (block 22), detail analysis (block 23), generate the artifacts (block 26), translate the artifacts to the RGB domain (block 28), and add the translated artifacts to the delayed signal (block 30). An alternative to the ROM 24 could be a random pattern generator for generating the artifacts.

Figure 6:
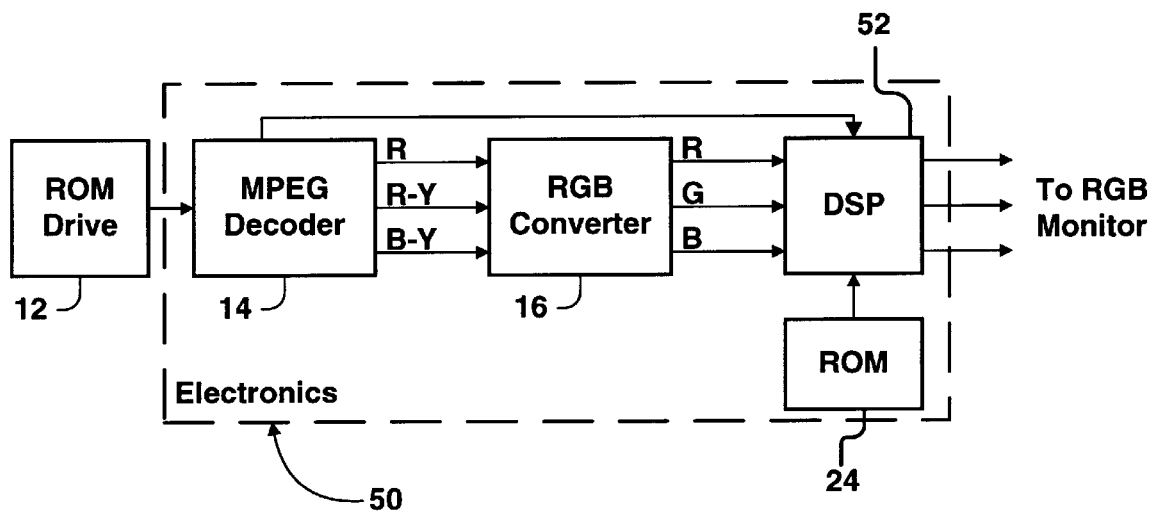
FIG. 6 is an alternative embodiment of the DVD-ROM drive and associated electronics.
Figure 7:
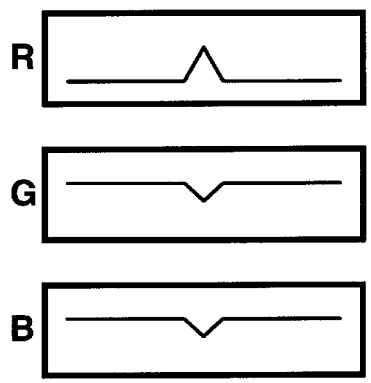
FIG. 7 is an illustration of RGB components after artifacts have been imposed by the alternative embodiment of the DVD-ROM electronics.

FIG. 6 shows an alternative embodiment of a DVD-ROM drive 10 and associated electronics 50. The electronics 50 includes the MPEG decoder 14 and the RGB converter 16. However, a DSP 52 performs redundancy and detail analysis on the RGB components provided by the RGB converter 16 instead of the YUV components provided by the MPEG decoder 14. Moreover, the DSP 52 generates the compressibility-reducing artifacts from components of the RGB domain instead of components of the YUV domain. FIG. 7 shows artifacts that have been added to the Red, Green and Blue components. Thus, the RGB output of the RGB converter 16 is simultaneously stored and used for generating artifacts. This embodiment would allow the DSP 52 to interface with a single ASIC including the MPEG decoder 14 and the RGB converter 16.

Figure 8:
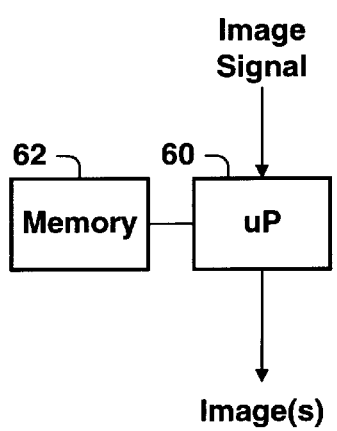
FIG. 8 is an embodiment of a processor according to the present invention.

FIG. 8 shows a microprocessor 60 that receives an image signal. The microprocessor 60 is programmed to store the image signal, perform redundancy and detail analysis, select the artifacts, translate the artifacts to the same domain as the stored signal, and add the artifacts to the stored signal. Artifact patterns are stored in memory 62. Instructions for the processor 60 are also stored in the memory 62. The microprocessor 60 can also perform pre-processing such as decoding and domain conversion of on the image signal.

Thus disclosed is an invention that discourages unauthorized copying and redistribution of large images and video sequences such as video sequences from DVD discs. The video images and video sequences include compressibility-reducing artifacts which will not be perceived by a viewer while the signal is being displayed. However, the artifacts will reduce the compressibility of the signal if the signal is intercepted and copied en route to the monitor. Consequently, the images represented by the copied signal will not be recompressed efficiently, and redistribution will not be practical.

The invention is not limited only to DVD-ROM electronics and DVD players. Nor is the invention limited to display devices including MPEG decoders. For example, a web browser could add artifacts to an image file that it downloads over the Internet. The artifacts could be added as the image file is being decompressed. Once the artifacts have been added to the image, the web browser would recompress the displayed image having the artifacts and replace the original image file with the modified image file. Since the modified image file would be much larger than the original image file, it would not be feasible for a person to save and later redistribute the modified image file.

The invention might be applied to a software program in which the user has the option of adding artifacts. For example, a graphics program that creates large color images could have an option for inserting artifacts. The graphics program might even allow a graphics designer to specify where the artifacts are to be inserted. Additionally, the graphics program might automatically analyze the image and impose compressibility-reducing artifacts.

The invention is not limited to the specific embodiments described above. For example, there are different ways to balance the domain components. In the YUV domain, for example, a change in intensity of luminance could be balanced by a change in the saturation of the U component alone, or it could be balanced by changes in the saturation of both the U component and the V component.

Looking for areas having minimal detail is not limited to analyzing areas for flatness of color. For example, the DSP 18 can find areas having minimal detail by looking at edges in an image.

The description above provides an example of one type of artifact. There are others. For example, high frequency artifacts in the Blue component would be less visible than high frequency artifacts in the Green component. The high frequency artifact in the Blue component would normally be imperceptible to a viewer. However, the high frequency artifact would reduce compressibility.

Thus, the invention is not limited to the specific embodiments described above. Instead, the invention is construed according to the claims that follow.

What is claimed is:

1. A method of processing an image signal representing at least one image, the image signal having domain components, the method comprising the steps of:
   analyzing the signal to select a redundant area of an image;
   adding a plurality of compressibility-reducing artifacts to the domain components of a selected area by making a first artifact change in at least one domain component of the selected area; and making at least one other artifact change to at least one other domain component of the selected area such that the artifacts in the selected area are perceptively balanced, whereby balanced artifacts are not perceptible while the processed signal is being displayed, and whereby an image including the artifacts is not readily compressible because the artifacts reduce redundancy in the image.

2. The method of claim 1, wherein the signal is analyzed for spatial redundancy in an image, and wherein correlated areas are selected as having spatial redundancy.

3. The method of claim 1, the image signal representing a plurality of images, wherein the signal is analyzed for temporal redundancy in the plurality of images, and wherein the artifacts are inserted into a selected area of one image, but not a correlated area of another image.

4. The method of claim 1, wherein the selected areas are also analyzed for minimal detail, whereby areas having minimal detail and redundancy are selected.

5. The method of claim 4, wherein the domain components are part of a domain in which luminance and chrominance components are separated.

6. The method of claim 5, wherein the first artifact change includes making intensity changes in the luminance component of the selected area; and wherein the at least one other artifact change includes making saturation changes in the chrominance component of the selected area to perceptively balance the change in intensity of the luminance component of the selected area.

7. The method of claim 6, wherein the step of analyzing the signal includes the steps of looking for minimal detail in the luminance component of the image; and looking for minimal detail in the chrominance components of the image if minimal detail in the luminance component is not found.

8. The method of claim 5, wherein the artifact changes include selecting an artifact pattern having a luminance component and a chrominance component; matching hue of the artifact pattern with hue of the selected area; adjusting intensity of the luminance component of the artifact pattern to fit within the selected area; and changing saturation of the hue of the artifact pattern to fit within the selected area.

9. The method of claim 5, wherein selecting the area and making the artifact changes include the steps of:
   picking a candidate area;
   identifying redundancy in the candidate area
   selecting a redundant area having relatively constant hue and saturation;
   changing intensity of the luminance component of the selected area such that the first artifact is introduced into the luminance component of the selected area; and
   changing the saturation of the color component in the portion to balance out the change in intensity of the luminance component in the selected area.

10. The method of claim 1, wherein the domain components are in the RGB domain, and wherein the artifact changes are made to at least two components of the RBG domain.

11. The method of claim 10, wherein the artifact changes include changing intensities of the RGB components such that they are perceptively balanced when displayed.

12. Apparatus for processing an image signal, the apparatus comprising:
   means for analyzing the image signal to find redundant areas of an image represented by the image signal;
   means for selecting redundant areas having minimal detail; and
   means for adding compressibility-reducing artifacts to at least two domain components of a selected area by making a first artifact change in at least one domain component of the selected area; and making a second artifact change in at least one other domain component of the selected area such that the artifacts are perceptively balanced.

13. The apparatus of claim 12, wherein the signal is analyzed for spatial redundancy in an image, and wherein correlated areas are selected as having spatial redundancy.

14. The apparatus of claim 12, the image signal representing a plurality of images, wherein the signal is analyzed for temporal redundancy in the plurality of images, and wherein the artifacts are inserted into a selected area of one image, but not a correlated area of another image.

15. The apparatus of claim 12, wherein the artifact changes include making intensity changes in a luminance component of the selected area; and wherein the at least one other artifact change includes making saturation changes in a chrominance component of the selected area to balance out the intensity changes in the luminance component of the selected area.

16. The apparatus of claim 12, wherein the artifact changes include selecting an artifact pattern having a luminance component and a chrominance component; matching hue of the artifact pattern with hue of the selected area; adjusting intensity of the luminance component of the artifact pattern to fit within the selected area; and changing saturation of the hue of the artifact pattern to fit within the selected area.

17. The apparatus of claim 12, wherein the area is selected and the artifact changes are made by picking a candidate area; identifying redundancy in the candidate area; selecting a redundant area having relatively constant hue and saturation; making intensity changes in the luminance component of the selected area; and making saturation changes in at least one chrominance component to balance the intensity changes in the luminance component.

18. The apparatus of claim 12, wherein the apparatus includes a digital signal processor for analyzing the signal, selecting the redundant areas, and adding the compressibility-reducing artifacts.

19. Apparatus comprising:
   means for providing an encoded signal;
   a decoder responsive to an output of the means for providing the encoded signal; and
   a processor operable to pick a candidate area of the image, analyze the candidate image for redundancy, select a redundant area having minimal detail, generate compressibility-reducing artifacts for a luminance component and at least one chrominance component of the selected area; and add the artifacts to the luminance and chrominance components of the selected area, the artifacts being added to the components of the selected area such that the artifacts are perceptively canceled when displayed.

20. The apparatus of claim 19, wherein the means for providing the encoded signal includes a DVD ROM drive, and wherein the decoder is an MPEG decoder.

21. The apparatus of claim 19, wherein the signal is analyzed for spatial redundancy in an image, and wherein correlated areas are selected as having spatial redundancy.

22. The apparatus of claim 19 the image signal representing a plurality of images, wherein the signal is analyzed for temporal redundancy in the plurality of images, and wherein the artifacts are inserted into a selected area of one image, but not a correlated area of another image.

23. The apparatus of claim 20, wherein the first artifact change includes making intensity changes in a luminance component of the selected area; and wherein the at least one other artifact change includes making saturation changes in a chrominance component of the selected area to perceptively balance out the intensity changes in the luminance component.

24. The apparatus of claim 20, wherein the artifact changes include selecting an artifact pattern having a luminance component and a chrominance component; matching hue of the artifact pattern with hue of the selected area; adjusting intensity of the luminance component of the artifact pattern to fit within the selected area; and changing saturation of the hue of the artifact pattern to fit within the selected area.

25. An article of manufacture for a processor, the article comprising:
   memory; and
   a plurality of executable instruction encoded in the memory, the instructions, when executed, causing the processor to pick a candidate area of the image, analyze the candidate image for redundancy, select a redundant area having minimal detail, generate compressibility-reducing artifacts for a luminance component and at least one chrominance component of the selected area; and add the artifacts to the luminance and chrominance components of the selected area, the artifacts being added to the components of the selected area such that the artifacts are perceptively balanced.

26. The article of claim 25, wherein the signal is analyzed for spatial redundancy in an image, and wherein correlated areas are selected for an image having spatial redundancy.

27. The article of claim 25, the image signal representing a plurality of images, wherein the signal is analyzed for temporal redundancy in the plurality of images, and wherein the artifacts are inserted into a selected area of one image, but not a correlated area of another image.

28. The article of claim 25, wherein the first artifact change includes making intensity changes in a luminance component of the selected area; and wherein the at least one other artifact change includes making saturation changes in a chrominance component of the selected area to perceptively balance out the intensity changes in the luminance component of the selected area.

29. The article of claim 25, wherein the artifact changes include selecting an artifact pattern having a luminance component and a chrominance component; matching hue of the artifact pattern with hue of the selected area; adjusting intensity of the luminance component of the artifact pattern to fit within the selected area; and changing saturation of the hue of the artifact pattern to fit within the selected area.

* * * * *